United States Patent

Tabata et al.

[11] Patent Number: 5,876,301
[45] Date of Patent: Mar. 2, 1999

[54] INTEGRAL CONTROL SYSTEM FOR ENGINE AND AUTOMATIC TRANSMISSION

[75] Inventors: Atsushi Tabata, Okazaki; Masato Kaigawa, Toyota, both of Japan

[73] Assignee: Toyota Jidosha Kabushiki Kaisha, Toyota, Japan

[21] Appl. No.: 813,589

[22] Filed: Mar. 7, 1997

[30] Foreign Application Priority Data

Mar. 25, 1996 [JP] Japan .................................. 8-094841

[51] Int. Cl.⁶ .................................................. B60K 41/06
[52] U.S. Cl. ............................ 477/109; 477/98; 477/106
[58] Field of Search ............................ 477/98, 102, 106, 477/107, 109

[56] References Cited

U.S. PATENT DOCUMENTS

| | | | |
|---|---|---|---|
| 4,355,550 | 10/1982 | Will et al. | 477/102 |
| 4,677,880 | 7/1987 | Hattori et al. | 477/109 |
| 5,101,687 | 4/1992 | Iwatsuki et al. | 477/109 |
| 5,109,826 | 5/1992 | Kato | 477/102 |
| 5,211,680 | 5/1993 | Sumimoto et al. | 477/98 |
| 5,309,791 | 5/1994 | Takada et al. | 477/98 |

FOREIGN PATENT DOCUMENTS 3-157560 7/1991 Japan .
7-139381 5/1995 Japan .

*Primary Examiner*—Charles A. Marmor
*Assistant Examiner*—Sherry Lynn Estremsky
*Attorney, Agent, or Firm*—Oblon, Spivak, McClelland, Maier & Neustadt, P.C.

[57] ABSTRACT

An integral control system for an engine and an automatic transmission, in which the engine torque is reduced at a shifting time by the automatic transmission. The control system comprises a mechanism for limiting the engine torque to a predetermined value or less prior to the start of a shift by the automatic transmission when a predetermined condition is satisfied at the time of the shift. The engine torque is continuously reduced to a predetermined value by throttling the throttle opening gradually by a throttle valve mechanism till the start of an inertia phase in the shift; is reduced by further throttling the throttle opening by the throttle valve mechanism in accordance with the start of the inertia phase; and is gradually returned by increasing the throttle opening continuously by the throttle valve mechanism after the torque reduction control.

17 Claims, 11 Drawing Sheets

FIG.10

| POSITION | | SOLENOID | | | | | | CLUTCH | | | BRAKE | | | | |
|---|---|---|---|---|---|---|---|---|---|---|---|---|---|---|---|
| | | NO.1 | NO.2 | NO.3 | NO.4 | SLU | SLN | C-1 | C-2 | C-0 | B-1 | B-2 | B-3 | B-4 | B-0 |
| P | | O | X | X | X | X | X | X | X | X | X | X | X | O | X |
| R | (V<20) | X | O | O | X | X | X | X | O | X | X | X | X | O | O |
| R | (V≥20) | O | O | O | X | X | X | X | X | X | X | X | X | O | X |
| N | | O | X | X | X | X | X | X | X | O | X | X | X | X | X |
| 1ST | ORDINARY | O | X | O | X | X | X | O | X | O | X | X | X | X | X |
| 1ST | E/G BRAKE | O | X | X | X | X | O | O | X | O | X | X | X | O | X |
| 2ND | ORDINARY | O | O | O | X | X | X | O | X | X | X | X | O | X | X |
| 2ND | E/G BRAKE | O | O | X | X | X | O | O | X | O | X | X | O | X | X |
| 3RD | ORDINARY | X | O | O | X | ◎ | X | O | X | O | X | O | X | X | X |
| 3RD | E/G BRAKE | X | O | X | X | ◎ | O | O | O | O | O | O | X | X | X |
| 4TH | | X | X | O | O | ◎ | X | O | O | X | X | O | X | X | X |
| 5TH | | X | X | O | O | ◎ | X | O | O | X | X | O | X | X | O |
| REMARKS | | ON: L-UP<br>OFF: L-UP | | ON<br>OFF | | ON<br>OFF | | | | | APPLY<br>RELEASE | | | | | |

O : ON / APPLY  
X : OFF / RELEASE  
◎ : —

INTEGRAL CONTROL SYSTEM FOR ENGINE AND AUTOMATIC TRANSMISSION

BACKGROUND OF THE INVENTION

1. Field of the Invention

The present invention relates to an integral control system for an engine and an automatic transmission, for executing a control to reduce the output torque of the engine at a shifting time.

2. Related Art

In a vehicle having an automatic transmission mounted thereon for executing shifts by applying/releasing frictional engagement units, the output torque of an engine is reduced at the shifting time so as to reduce the shift shocks, to shorten the shifting time and to improve the durability of the frictional engagement units. This torque reducing control is generally performed by controlling the angular delay in the ignition timing of the engine because of its high responsiveness. However, the reduction in the engine torque to be achieved by the angular delay control of the ignition timing is relatively small. When the ignition timing is delayed, the exhaust gas is deteriorated to raise a load upon the exhaust cleaning system.

In the prior art, therefore, there has been developed a technique for reducing the engine torque at a shifting time by lowering the throttle opening. One example of this technique is disclosed in JP-A-3-157560. The invention, as disclosed, is applied to an engine which is equipped with an electronically controlled sub-throttle valve upstream of a main throttle valve acting with the accelerator pedal. Simultaneously with the start of the shift control, the sub-throttle valve is so throttled that the engine torque may not change. At the instant when the start of an inertia phase is detected, the sub-throttle valve is further throttled to reduce the engine torque. From the instant when it is decided that the inertia phase ends or comes to an end, the sub-throttle valve is gradually opened to increase the engine torque.

In the aforementioned control system of the prior art, the degree of opening of the sub-throttle valve is lowered according to the start of the shift control. The drop of this degree of opening so responses to the degree of opening of the main throttle valve as to cause no change in the engine torque. As a result, the engine torque is substantially reduced by further throttling the sub-throttle valve after the start of the inertia phase so that the drop in the engine torque will never fail to become considerably large. As a result, if the timing of the execution of the control of reducing the engine torque is off, the engine torque so highly drops in the torque phase that it causes a drop in the output torque, thereby resulting in shift shocks.

In order to eliminate this disadvantage, the start of the inertia phase has to be accurately detected, and the opening of the sub-throttle valve has also to be lowered. These necessities raise another disadvantage that a control of extremely high accuracy is demanded.

SUMMARY OF THE INVENTION

A main object of the present invention is to execute the engine torque reducing control at the shifting time without any response delay.

Another object of the present invention is to execute the torque reducing control, in which the engine torque is reduced at the shifting time by a throttle valve mechanism, without any delay.

Still another object of the present invention is to execute the torque reducing control satisfactorily at the time of a jump shift while the setting of a predetermined gear stage is being inhibited.

In order to achieve these objects, the control system according to the present invention decides whether or not a predetermined condition is satisfied, and limits the engine torque at a gear stage before the shift if the condition is satisfied. This condition is basically that the shift control cannot be satisfactorily executed. As a result, since the engine torque before the shift drops, the reduction in the engine torque at the shifting time is so decreased that the response delay in the engine torque reducing control and the shocks due to the torque change can be prevented.

Moreover, the control system of the present invention reduces the engine torque in the torque phase after the shift start and before the start of the inertia phase. As a result, the shift shocks are neither deteriorated even with an error in the detection of the inertia phase, nor arises a delay in the torque reducing control in the inertia phase.

Still moreover, the control system of the present invention reduces the output torque of the engine by controlling the engine with the throttle valve mechanism. As a result, the reduction in the engine torque can be increased so that the engine torque at the time of the so-called "jump shift" to a gear stage apart by two stages or more can be reduced necessarily and sufficiently. In this case, the response delay can be reliably prevented by limiting the engine torque at the gear stage before the shift.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 10 is a clutch/brake application diagram enumerating the applications of frictional engagement units for setting the individual gear stages in the automatic transmission;

DETAILED DESCRIPTION OF THE PREFERRED EMBODIMENT

Figure 7:
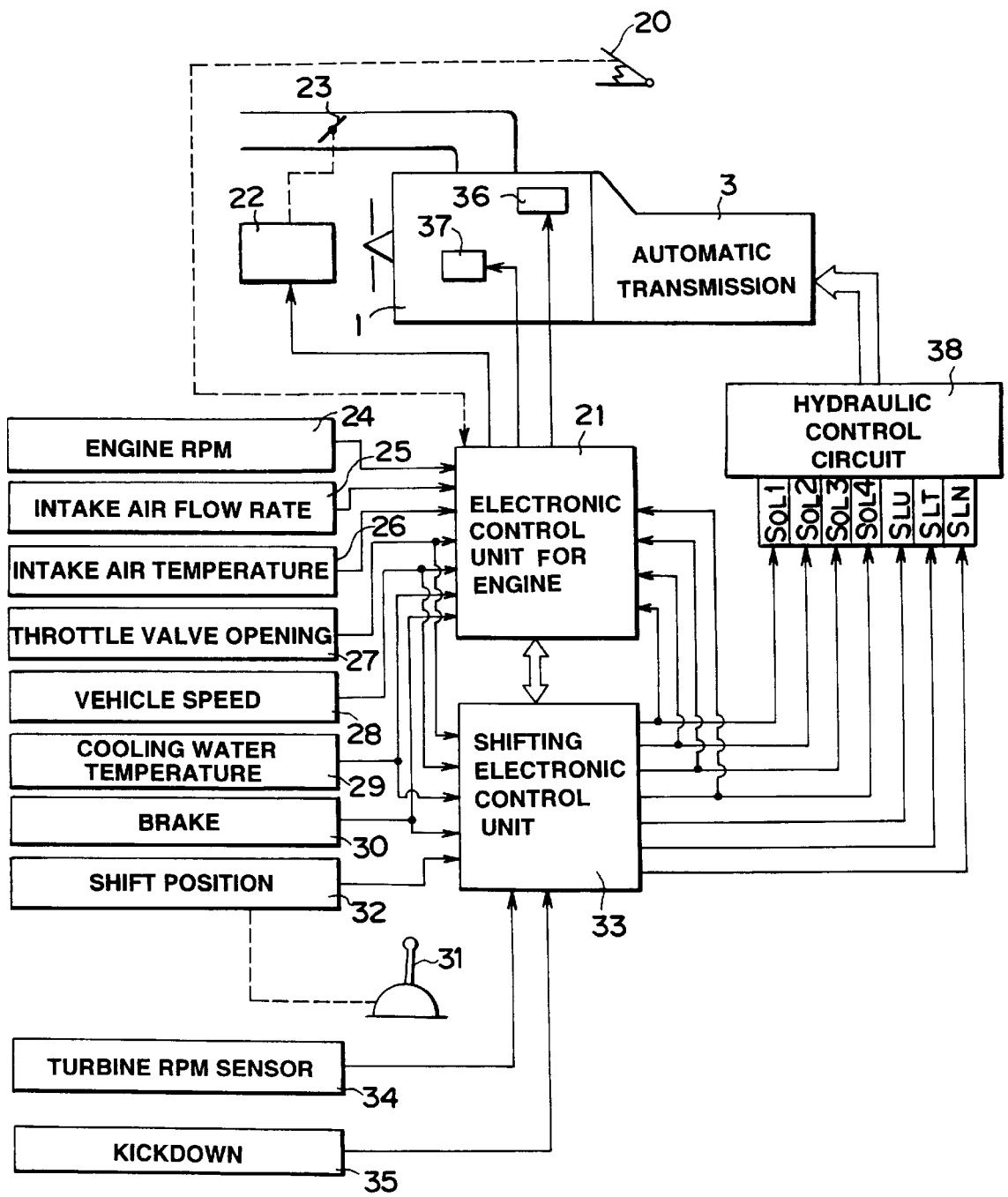
FIG. 7 is a block diagram schematically showing a control system to which is applied the present invention.

The present invention will be described in more detail with reference to the accompanying drawings. First of all, here will be described the entire construction including an engine 1 and an automatic transmission 3, to which is applied the present invention. FIG. 7 is a control system diagram showing the engine 1 and the automatic transmission 3. A signal according to the depression of an accelerator pedal 20 is inputted to an electronic control unit 21 for the engine. On the other hand, the intake pipe of the engine 1 is equipped with an electronic throttle valve 23 to be driven by a throttle actuator 22 (or servo motor). Moreover, a control signal is outputted according to the depression of the accelerator pedal 20 from the electronic control unit 21 to the throttle actuator 22 so that the degree of opening of the electronic throttle valve 23 is controlled by the degree of control.

There are further provided: an engine RPM sensor 24 for detecting the RPM of the engine 1; an air flow meter 25 for detecting the intake air flow rate; an intake air temperature sensor 26 for detecting the temperature of the intake air; a throttle sensor 27 for detecting the degree of opening θ of the electronic throttle valve 23; a vehicle speed sensor 28 for detecting a vehicle speed V in terms the RPM of the output shaft 17; a cooling water temperature sensor 29 for detecting the cooling water temperature of the engine 1; a brake switch 30 for detecting the operation of the brake; and a shift position sensor 32 for detecting the shift position of a shift lever 31. From these sensors, there are fed to the engine electronic control unit 21 the signals indicating an engine RPM Ne, the intake air flow rate, an intake air temperature Tha, the opening θ of the electronic throttle valve 23, the vehicle speed V, the engine cooling water temperature THw, and a brake signal BK indicating the brake operating rate. To a shifting electronic control unit 33, on the other hand, there are inputted signals indicating the opening θ of the electronic throttle valve 23, the vehicle speed V, the engine cooling water temperature THw, the brake signal BK indicating the operation state of the brake, and an operation position Psh of the shift lever 31.

To the shifting electronic control unit 33, moreover, there is inputted a signal indicating a turbine RPM NT from a turbine RPM sensor 34 for detecting the RPM of a turbine runner. Further inputted to the shifting electronic control unit 33 is a signal indicating a kickdown operation from a kickdown switch 35 for detecting that the accelerator pedal 20 has been operated to its maximum operation position.

The engine electronic control unit 21 is the so-called "microcomputer" which is equipped with a central processing unit (CPU), a storage unit (including an RAM and a ROM) and an input/output interface. The CPU processes the input signals to execute a variety of engine controls in accordance with the programs stored in advance in the ROM while utilizing the temporary storage function of the RAM. For example, the engine electronic control unit 21 controls a fuel injection valve 36 for controlling a fuel injection rate, an igniter 37 for controlling the ignition timing, and the not-shown bypass valve for controlling the idle speed, and executes all the throttle controls including a traction control by controlling the electronic throttle valve 23 with the throttle actuator 22. Incidentally, these controls include one for reducing the engine torque at a shifting time.

The shifting electronic control unit 33 is also a microcomputer similar to that of the engine electronic control unit 21, and its CPU utilizes the temporary storage function of a RAM to process the input signals in accordance with the programs stored in advance in a ROM and to drive the individual solenoid valves or linear solenoid valves of a hydraulic control circuit 38. For example, the shifting electronic control unit 33 controls a linear solenoid valve SLT for producing an output pressure PSLT having a level corresponding to the opening of the throttle valve 23. Further controlled is a linear solenoid valve SLN for controlling the accumulator back pressure. Further controlled is a linear solenoid valve SLU for controlling the slip of the lockup clutch and for controlling the application pressure of a predetermined one of the clutches and brakes at a transient time of the shift in accordance with the progress of the shift and the input torque.

In addition, the shifting electronic control unit 33 determines the gear stage of the automatic transmission 3 and the application state of the lockup clutch on the basis of the shift diagram which uses the fundamental throttle opening TTA (i.e., the throttle opening, as converted by predetermined non-linear characteristics against the depression of the accelerator pedal 20) and the vehicle speed V as its parameters. The shifting electronic control unit 33 drives No. 1 to No. 3 shift solenoid valves SOL1, SOL2 and SOL3 in a hydraulic control circuit 38 to achieve the gear stage and the application state thus determined, and drives a No. 4 solenoid valve SOL4 to establish an engine braking effect.

Figure 8:
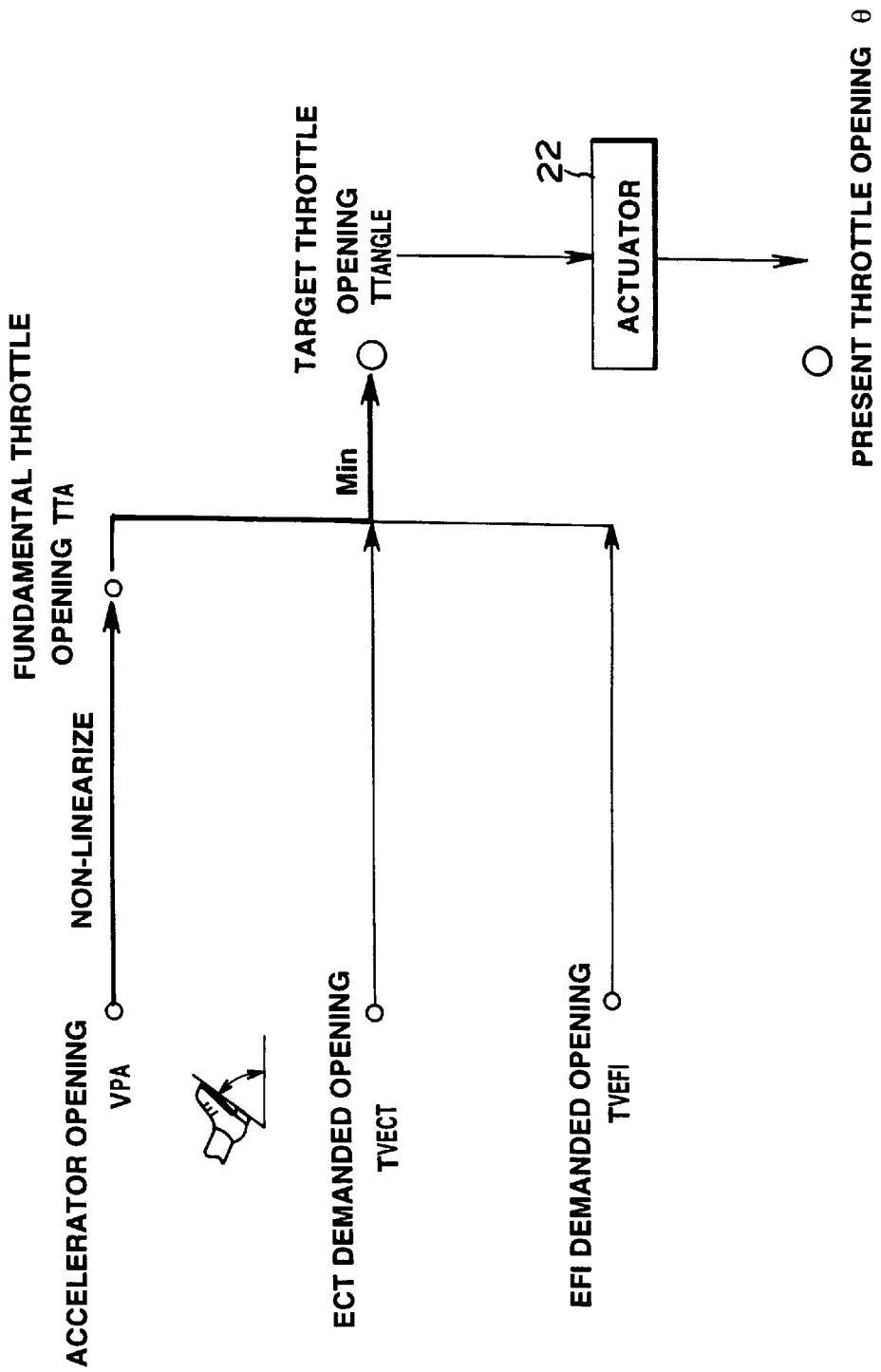
FIG. 8 is an explanatory diagram for explaining the determinant factors of the throttle opening in the engine to which is applied an embodiment of the present invention.

Here will be described the control of the electronic throttle valve 23. This electronic throttle valve 23 is controlled, as the engine electronic control unit 21 drives the throttle actuator 22 in accordance with the depression of the accelerator pedal 20, and the opening, as based on other control factors, is added or subtracted from the fundamental throttle opening TTA corresponding to the depression (or accelerator opening) VPA of the accelerator peal 20. This relation is illustrated in the diagram of FIG. 8. A target throttle opening TTANGLE is exemplified by the minimum of either a throttle opening TVECT, as demanded on the basis of the fundamental throttle opening TTA and the shift in the automatic transmission 3, or a throttle opening TVEFI, as demanded on the basis of the fuel injection control. Moreover, the engine electronic control unit 21 drives the throttle actuator 22 so as to achieve its target throttle opening TTANGLE so that a present throttle opening θ is achieved. Moreover, the characteristics of the fundamental throttle opening TTA against the accelerator opening VPA are made non-linear and can be changed according to the drive state of the engine 1 and the operation state of the automatic transmission 3.

Figure 9:
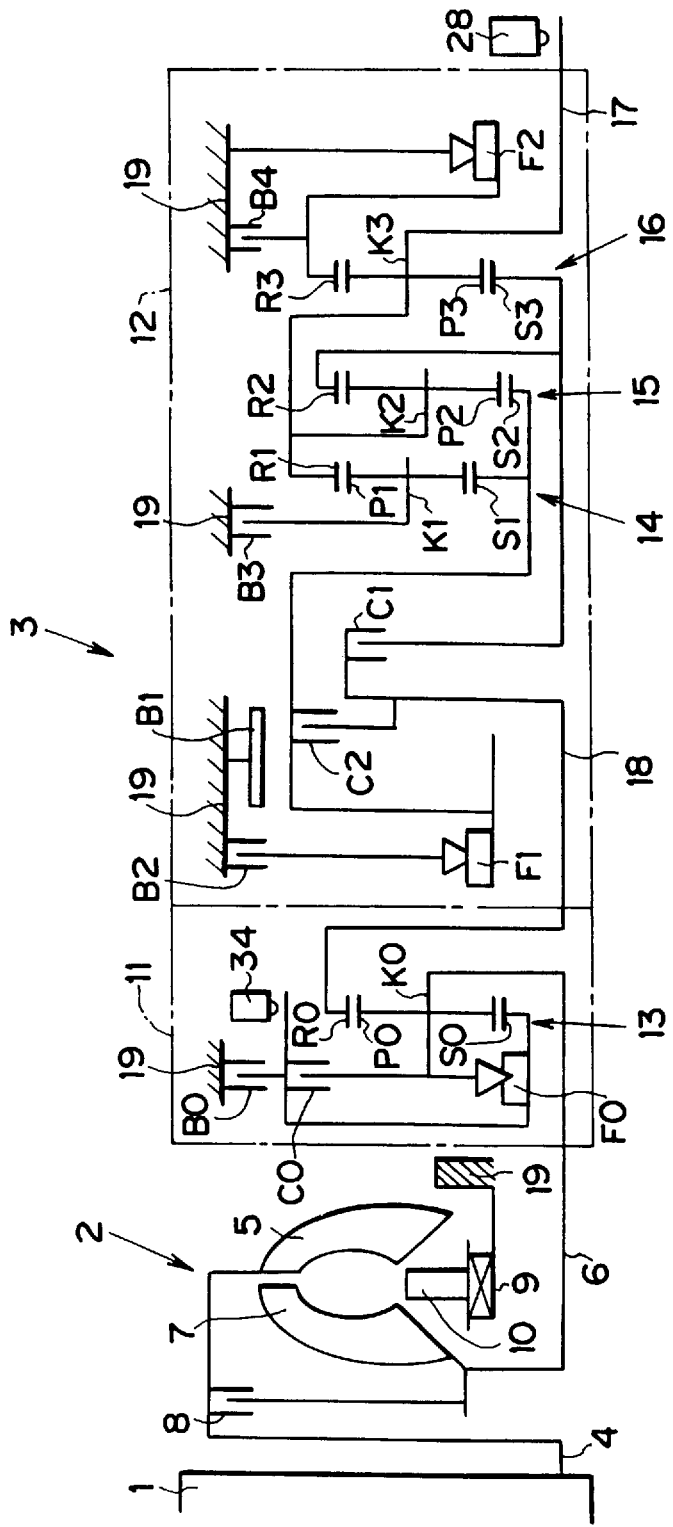
FIG. 9 is a skeleton diagram showing one example of the gear train of an automatic transmission to which is applied the present invention.

Here will be described the automatic transmission 3 which is connected to the engine 1. To this engine 1, as shown in FIG. 9, there is connected through an automatic transmission 3 a torque converter 2. This torque converter 2 is equipped with: a pump impeller 5 connected to a crankshaft 4 of the engine 1; a turbine runner 7 connected to an input shaft 6 of the automatic transmission 3; a lockup clutch 8 for connecting those pump impeller 5 and turbine runner 7 directly; and a stator 10 prevented from rotating in one direction by a one-way clutch 9.

The automatic transmission 3 is equipped with an auxiliary transmission 11 for interchanging two high and low gear stages, and a main transmission 12 for interchanging a reverse gear stage and four forward gear stages. The auxiliary transmission 11 is equipped with an HL planetary gear unit 13 composed of the sun gear S0, the ring gear R0 and a pinion P0 rotatably supported by a carrier K0 and meshing with the sun gear S0 and the ring gear R0; a clutch C0 and a one-way clutch F0 interposed between the sun gear S0 and the carrier K0; and a brake B0 interposed between the sun gear S0 and a housing 19.

The main transmission 12 is equipped with: a first planetary gear unit 14 composed of a sun gear S1, a ring gear R1, and a pinion P1 rotatably supported by a carrier K1 and meshing with those sun gear S1 and ring gear R1; a second planetary gear unit 15 composed of a sun gear S2, a ring gear R2, and a pinion P2 rotatably supported by a carrier K2 and meshing with those sun gear S2 and ring gear R2; and a third planetary gear unit 16 composed of a sun gear S3, a ring gear R3, and a pinion P3 rotatably supported by a carrier K3 and meshing with those sun gear S3 and ring gear R3.

The two sun gears S1 and S2 are connected to each other, and the ring gear R1 and the carriers K2 and K3 are connected to each other. The latter carrier K3 is connected to an output shaft 17. On the other hand, the ring gear R2 is integrally connected to the sun gear S3. Moreover, a first clutch C1 is interposed between the ring gear R2 and the sun gear S3 and an intermediate shaft 18, and a second clutch C2 is interposed between the sun gears S1 and S2 and the intermediate shaft 18.

As the brake means, on the other hand, there is mounted in the housing 19 a first brake B1 of band type for stopping the rotations of the sun gear S1 and the sun gear S2. Between the sun gears S1 and S2 and the housing 19, there are mounted in series the first one-way clutch F1 and a brake B2. This first one-way clutch F1 is constructed to be applied when the sun gears S1 and S2 are to rotate in the direction opposite to the input shaft 6.

A third brake B3 is interposed between the carrier K1 and the housing 19, and a fourth brake B4 and the second one-way clutch F2 are interposed in parallel between the ring gear R3 and the housing 19. This second one-way clutch F2 is constructed to be applied when the ring gear R3 is to rotate backward. The clutches C0, C1 and C2 and the brakes B0, B1, B2, B3 and B4 thus far recited are the hydraulic type frictional engagement units, the friction elements of which are applied when actuated by the oil pressure.

The automatic transmission thus far described can set five forward and one reverse gear stages, and the applied/released states of the individual frictional engagement units for those gear stages are tabulated in the clutch/brake application diagram of FIG. 10. In FIG. 10, symbols ○ indicate the applied states, and symbols X indicate the released states.

Figure 11:
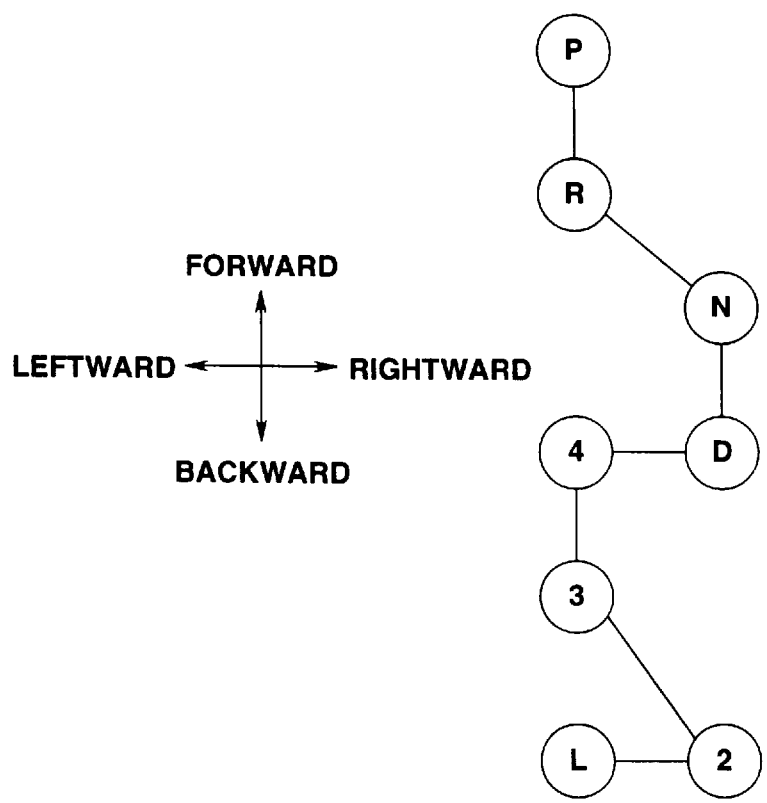
FIG. 11 is a diagram showing the shift positions of the automatic transmission.

FIG. 11 illustrates the shift positions of the shift lever 31. As shown, this shift lever 31 is so supported by the not-shown support unit as can be operated into eight shift positions by combining the six shift positions, as taken in the longitudinal directions of the vehicle, and two shift positions, as taken in the transverse directions of the vehicle. Specifically: letter P designates a parking range position; letter R a reverse range position; letter N a neutral range position; letter D a drive range position; numeral "4" a "fourth" range position covering the gear stages to the fourth speed; numeral "3" a "third" range position covering the gear stages to the third speed; numeral "2" a "second" range position covering the gear stages to the second speed; and letter L a low range position for inhibiting the upshift to the gear stages over the first speed.

In the automatic transmission 3 shown in FIG. 10, the speed change between the second speed and the third speed is the clutch-to-clutch shift for changing the application states of both the third brake B3 and the second brake B2. For the shift control, the frictional engagement units to participate in the speed change has to be controlled in an underlap or overlap state in accordance with the power ON/OFF state or the shift-up/shift-down state. Specifically, the oil pressure of the second brake B2 has to be controlled according to the input torque, and the oil pressure of the third brake B3 has to be controlled on the basis of the advance in the speed change. In order to execute this speed change smoothly and quickly, a circuit, as shown in FIG. 12, is assembled in the aforementioned hydraulic control circuit 38, as will be simply described in the following.

Figure 12:
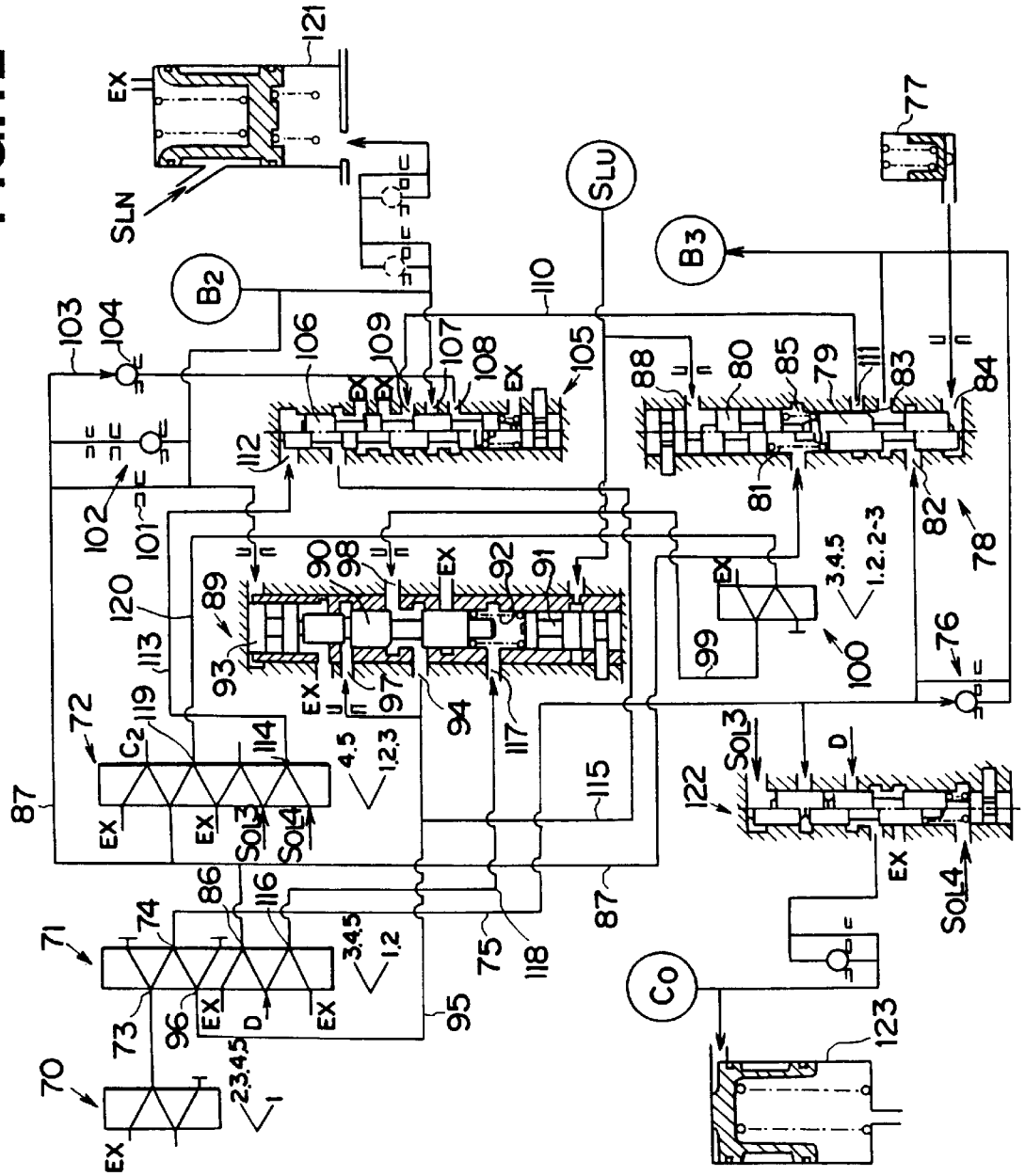
FIG. 12 is a hydraulic circuit diagram showing a portion of a hydraulic circuit which belongs to the automatic transmission.

In FIG. 12: reference numeral 70 designates a 1–2 shift valve; numeral 71 designates a 2–3 shift valve; and numeral 72 designates a 3–4 shift valve. These shift valves 70, 71 and 72 have their individual ports opened to have communications at the individual gear stages, as respectively enumerated below themselves. Incidentally, the numerals indicate the individual gear stages. Of the ports of the 2–3 shift valve 71, a brake port 74 to communicate with an input port 73 at the first and second speeds is connected to the third brake B3 via an oil passage 75. This oil passage 75 is equipped with an orifice 76, and a damper valve 77 is connected between the orifice 76 and the third brake B3. The damper valve 77 sucks the oil pressure a little to perform its damping action in case the third brake B3 is abruptly fed with the line pressure.

Reference numeral 78 designates a B-3 control valve for controlling the application pressure of the third brake B3 directly. Specifically, the B-3 control valve 78 is equipped with a spool 79, a plunger 80 and a spring 81 sandwiched between the former two. An input port 82 to be opened/closed by the spool 79 is connected to the oil passage 75, and an output port 83 to be selectively caused to communicate with the input port 82 is connected to the third brake B3. The output port 83 is further connected to a feedback port 84 which is formed at the leading end of the spool 79. On the other hand, a port 85 opened into a portion, in which the aforementioned spring 81 is arranged, is made to communicate with such one 86 of the ports of the 2–3 shift valve 71 via an oil passage 87 as outputs a D-range pressure at a third or higher speed gear stage. Moreover, a control port 88 formed at the side of the end portion of the plunger 80 is connected to a lockup clutch linear solenoid valve SLU.

As a result, the B-3 control valve 78 has its regulated pressure level set by the elastic force of the spring 81 and the oil pressure fed to the port 85. In this case, as the higher signal pressure is fed to the control port 88, the larger becomes the elastic force of the spring 81.

In addition, reference numeral 89 appearing in FIG. 12 designates a 2–3 timing valve which is constructed to include: a spool 90 formed with one radially smaller land and two radially larger lands; a first plunger 91; a spring 92 sandwiched between the former two; and a second plunger 93 arranged at the side opposed to the first plunger 91 across the spool 90. This 2–3 timing valve 89 has its intermediate port 94 connected to an oil passage 95, which in turn is connected to such a port 96 of the 2–3 shift valve 71 as is caused to communicate with the brake port 74 at a third or higher speed gear stage.

Moreover, the oil passage 95 is branched in its midway and connected through an orifice to a port 97 which is opened between the aforementioned smaller-diameter land and one of the larger-diameter lands. A port 98 to be selectively caused to communicate with the port 94 at the intermediate portion is connected via an oil passage 99 to a solenoid relay valve 100. Moreover, the lockup clutch linear solenoid valve SLU is connected to the port which is opened in the end portion of the first plunger 91, and the second brake B2 is connected through an orifice to the port which is opened in the end portion of the second plunger 93.

The aforementioned oil passage 87 is provided for applying/releasing the oil pressure to and from the second brake B2 and is equipped in its midway with a smaller-diameter orifice 101 and an orifice 102 having a check ball. From this oil passage 87, there is branched an oil passage 103 which is equipped with a larger-diameter orifice 104 having a check ball to be opened when the second brake B2 is to be released. The oil passage 103 is connected to an orifice control valve 105, as will be described in the following.

This orifice control valve 105 controls the rate of releasing the pressure from the second brake B2. This second brake B2 is connected to a port 107 which is so formed in an intermediate portion as can be opened or closed by a spool 106 of the orifice control valve 105. The aforementioned oil passage 103 is connected to a port 108 which is formed below that port 107, as shown. A port 109 is formed above the port 107 connected to the second brake B2, as shown, and is selectively caused to communicate with a drain port. To that port 109, there is connected via an oil passage 110 a port 111 of the aforementioned B-3 control valve 78. Incidentally, this port 111 is selectively caused to communicate with the output port 83 which is connected to the third brake B3.

Of the ports of the orifice control valve 105, a control port 112 formed at the end portion opposed to the spring for urging the spool 106 is connected to a port 114 of the 3–4 shift valve 72 via an oil passage 113. This port 114 outputs a signal pressure of the third solenoid valve SOL3 at a third or lower speed gear stage and a signal pressure of the fourth solenoid valve SOL4 at a fourth or higher speed gear ratio. To the orifice control valve 105, moreover, there is connected an oil passage 115 which is branched from the aforementioned oil passage 95 and which is selectively caused to communicate with the drain port.

Incidentally, in the aforementioned 2–3 shift valve 71, a port 116 for outputting a D-range pressure at a second or lower speed gear state is connected via an oil passage 118 to a port 117 which is opened in such a portion of the aforementioned 2–3 timing valve 89 as is arranged with the spring 92. In the 3–4 shift valve 72, moreover, a port 119, which is caused to communicate with the aforementioned oil passage 87 at a third or lower speed gear stage, is connected via an oil passage 120 to the solenoid relay valve 100.

In FIG. 12, reference numeral 121 designates an accumulator for the second brake B2. A back pressure chamber of the accumulator 121 is supplied with an accumulator control pressure which is regulated on the basis of the oil pressure outputted by the linear solenoid valve SLN. Incidentally, the accumulator control pressure is controlled according to the input torque and becomes higher as the output pressure of the linear solenoid valve SLN is lowered. Accordingly, in a transition region between application and release of the second brake B2, the oil pressure thereof is changed to a higher level as the signal pressure of the linear solenoid valve SLN is lowered. By lowering the signal pressure of the linear solenoid valve SLN temporarily, on the other hand, the application pressure of the second brake B2 can be temporarily raised.

Moreover, reference numeral 122 designates a C-0 exhaust valve, and numeral 123 designates an accumulator for the clutch C0. Incidentally, the C-0 exhaust valve 122 applies the clutch C0 so as to effect the engine braking only at the second speed in the second speed range.

According to the hydraulic circuit thus far described, therefore, if the port 111 of the B-3 control valve 78 is in communication with the drain, the application pressure to be fed to the third brake B3 can be directly regulated by the B-3 control valve 78, and its regulated pressure level can be varied by the linear solenoid valve SLU. If, on the other hand, the spool 106 of the orifice control valve 105 is in the position, as shown at the lefthand side of FIG. 12, the second brake B2 has communication with the oil passage 103 through that orifice control valve 105. As a result, the pressure can be released through the larger-diameter orifice 104 to control the rate of releasing the pressure from the second brake B2.

In the automatic transmission 3 thus far described, the application pressure of the third brake B3 to be applied for setting the second speed is directly controlled by the linear solenoid valve SLU. Moreover, the speed change between the second speed and the third speed is the clutch-to-clutch shift in which both the applied/released states of the second brake B2 and the third brake B3 are changed. Therefore, the setting of the second speed has to be premised by the fact that an accurate oil pressure control can be achieved. If the oil temperature is so low that the oil has a high viscosity, for example, it is thought that the responsiveness of the oil pressure will drop to make the accurate control impossible thereby to deteriorate the shift shock. If the second speed is inhibited to avoid the deterioration, it is necessary to perform the so-called "jump shift" from the first speed to the third speed. Unless, in this case, the engine torque (or the torque inputted to the automatic transmission 3) is sufficiently reduced, there arise disadvantages such as the shift shock or the deterioration in the durability of the frictional engagement units. Therefore, the control system thus far described according to the present invention execute the engine torque control and the shift control, as will be described in the following.

Figure 1:
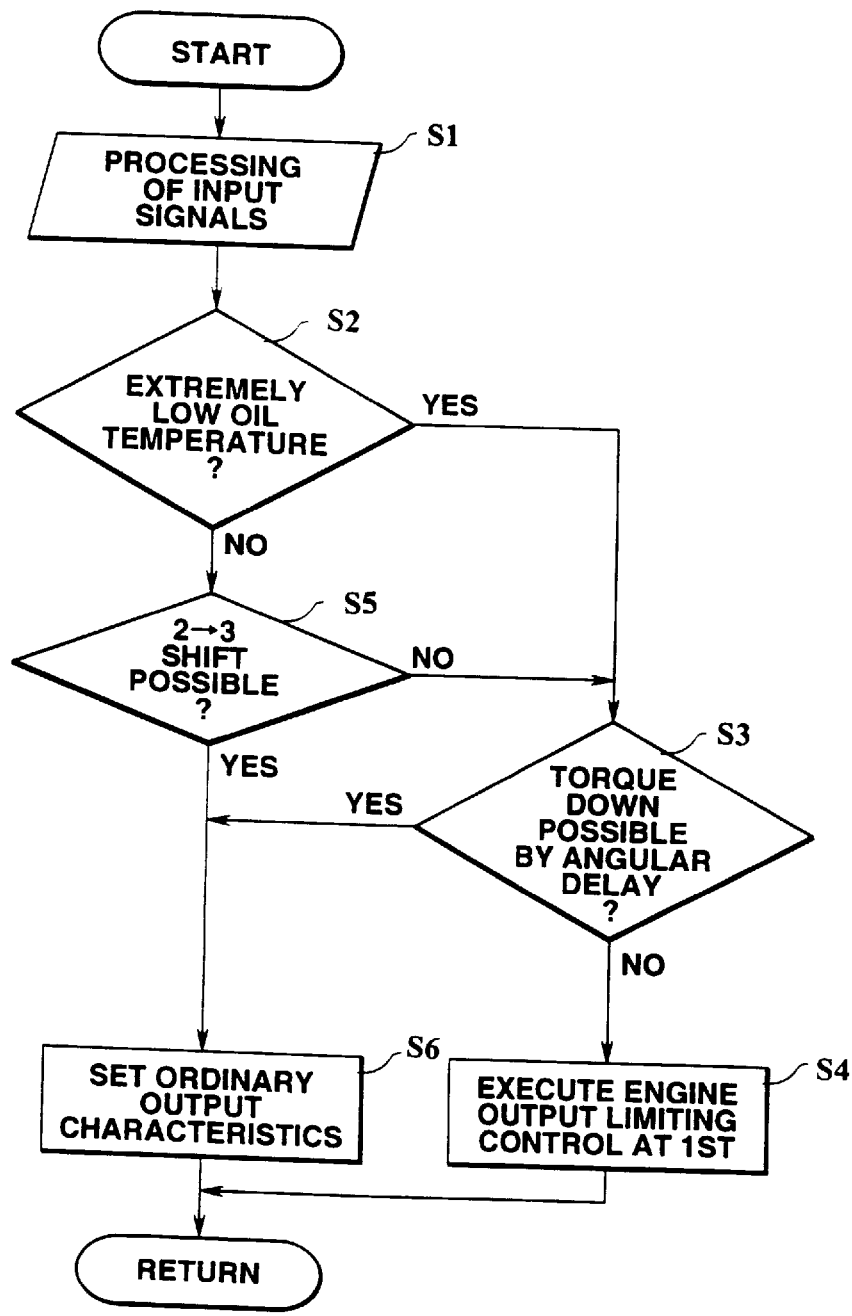
FIG. 1 is a flow chart for explaining an engine output limiting control to be executed in a control system of the present invention.

FIG. 1 is a flow chart showing a routine for executing the control for limiting the engine torque on condition of the oil temperature. At first, input signals are processed (at Step S1) including the readings of the signals from the individual sensors and decisions of the failures of the individual sensors. It is then decided (at Step S2) from the read data whether or not the oil temperature is extremely low. Here, a reference temperature for deciding the oil temperature is exemplified by −15° or −30° C., at which the viscosity of the fluid in the automatic transmission 3 grows so high as to block the normal hydraulic control. In short, the operation of Step 2 decides the propriety of the hydraulic control indirectly.

If the decision of Step S2 is affirmed, it is decided (at Step S3) whether or not the engine torque can be reduced by the angular delay control of the ignition timing. With this angular delay control of the ignition timing in the engine, the combustion grows unstable to deteriorate the exhaust thereby to increase the load upon the (not-shown) exhaust cleaning catalyst. Thus, the angular delay control of the ignition timing is inhibited when the engine water temperature is low (or when the engine is not sufficiently warmed up yet), when the exhaust cleaning catalyst (or catalytic converter) is so cold that its exhaust cleaning function is not sufficient, or when the angular delay control of the ignition timing is continuously effected so that the exhaust cleaning catalyst takes an excessively high temperature. In short, the angular delay control of the ignition timing is inhibited when the temperature of the exhaust cleaning catalyst fails to fall within a preset range. This particular state is decided at Step S3.

If the decision of Step S3 is denied, that is, if it is decided that the angular delay control of the ignition timing cannot be executed, the control of limiting the engine output at the first speed is executed (at Step S4). The throttle opening is set to a predetermined value, as described hereinbefore. That is, the throttle opening is calculated by the engine electronic control unit 21 on the basis of the depression of the accelerator pedal 20, and the throttle actuator 22 is driven on the basis of the calculation result. The control characteristics or the output characteristics of the engine to the accelerator opening are generally non-linear but can be modified on the basis of proper conditions. Therefore, the control system according to the present invention limits the opening of the throttle valve 23 to a predetermined value or less to limit the engine output even with the accelerator pedal 20 being depressed to a certain stroke or more, if the oil temperature is too low to execute the angular delay control of the ignition timing, that is, if the control conditions are satisfied. Hence, the operation of Step S4 corresponds to the engine torque limiting means in the present invention.

Figure 2:
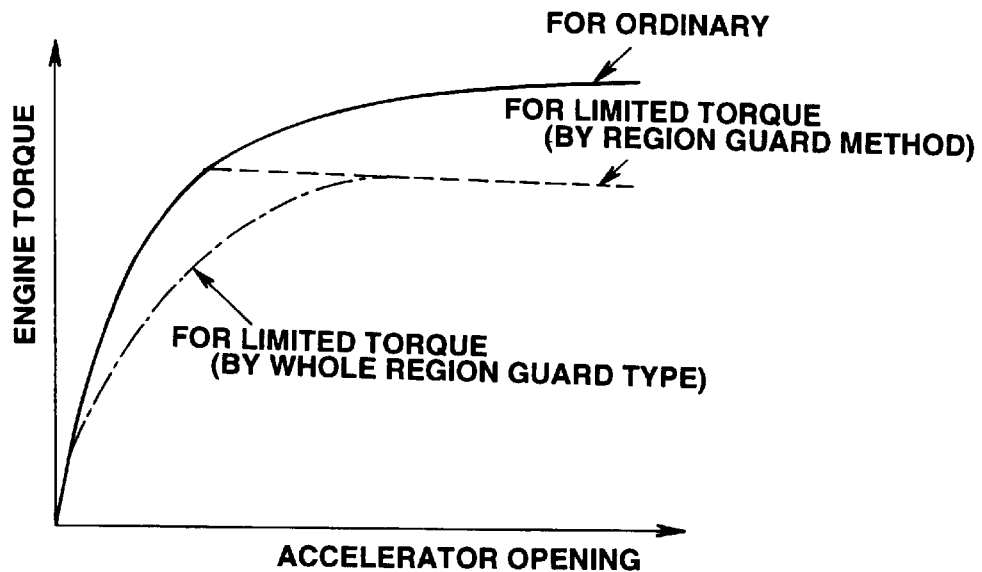
FIG. 2 is a diagram illustrating one example of the characteristics of an engine torque against an accelerator opening for the engine output limiting control.

This limit may be exemplified, as illustrated in FIG. 2, either by a mode (as indicated by a broken line) in which the engine torque is limited to a constant upper level or by a mode (as indicated by a single-dotted line) in which the output characteristics themselves are set at a low level. These limit modes will be briefly described in the following. In the former mode of restricting the upper limit to a constant level, in order to achieve a necessary output reduction for reducing the engine output from the state of a large accelerator opening, this accelerator opening has to be highly lowered, and a response delay may happen. In the latter limiting mode, on the other hand, the engine output will smoothly change as a whole, and it is possible to relieve the so-called "saturation feeling" to feel that the engine output does not rise suddenly after the accelerator pedal was depressed to a certain stroke. Incidentally, a solid curve in FIG. 2 indicates the ordinary state in which the output is not limited.

On the other hand, if the decision of Step S2 is denied by the fact that the oil temperature is so high as to exert no influence upon the oil pressure control, it is decided (at Step S5) whether or not the shift from the second speed to the third speed is possible. The oil pressure of the third brake B3 for setting the second speed is connected directly by the linear solenoid valve SLU, and the upshift from the second speed to the third speed is the clutch-to-clutch shift, as described hereinbefore. As a result, this shift control cannot be executed in the normal manner if the oil temperature is so low as to influence the oil pressure control. In this case, therefore, the operation of Step S2 may be inhibited, and the decision of Step S5 can then be covered by that of Step S2.

For controlling the oil pressure of the third brake B3, on the other hand, it is required that the linear solenoid valve SLU normally operates and that an input RPM NCO can be accurately detected. At Step S5, therefore, the possibility of the shift from the second speed to the third speed may be decided depending upon whether or not those requirements are satisfied, that is, whether or not the input RPM sensor and the linear solenoid valves SLU fail.

If the shift from the second speed to the third speed is possible, the normal output characteristics (as indicated by the solid curve in FIG. 2) are set (at Step S6) without limiting the engine output especially. If, on the contrary, the shift from the second speed to the third speed cannot be executed by inhibiting the second speed, the routine advances to Step S3, at which it is decided whether or not the engine torque reducing control can be executed by the angular delay control of the ignition timing. If this decision is denied, the routine advances to Step S4, at which the control of limiting the engine output is executed, as described above. If the decision is affirmed, on the contrary, the routine advances to Step S6, at which the normal output characteristics are set. In short, even in the impossible state of the upshift from the second speed to the third speed, the control of reducing the engine torque by the angular delay control of the ignition timing is executed, if possible.

By the control shown in FIG. 1, therefore, the torque reducing control at the shifting time is executed by throttling the throttle valve 23 if the angular delay control of the ignition timing is impossible. In this case, the engine output is set beforehand, namely, before the shift to a low output by limiting it to a predetermined value, so that the torque reduction accompanying the shift can be relatively lowered to avoid the response delay. On the other hand, the limit of the engine output is executed only if the special conditions are satisfied by an extremely low oil temperature or by the impossibility of the upshift from the second speed to the third speed, so that incompatibility is relieved even with no more increase in the engine output.

If the oil temperature is extremely low, as described hereinbefore, it becomes difficult to control the oil pressure of the third brake B3. If the sensors or control devices to take direct participations into the pressure control fail, the oil pressure of the third brake B3 cannot be normally controlled. In this case, the control of inhibiting the setting of the second speed is executed, as exemplified in FIG. 3 and FIGS. 4(A) and 4(B).

Figure 3:
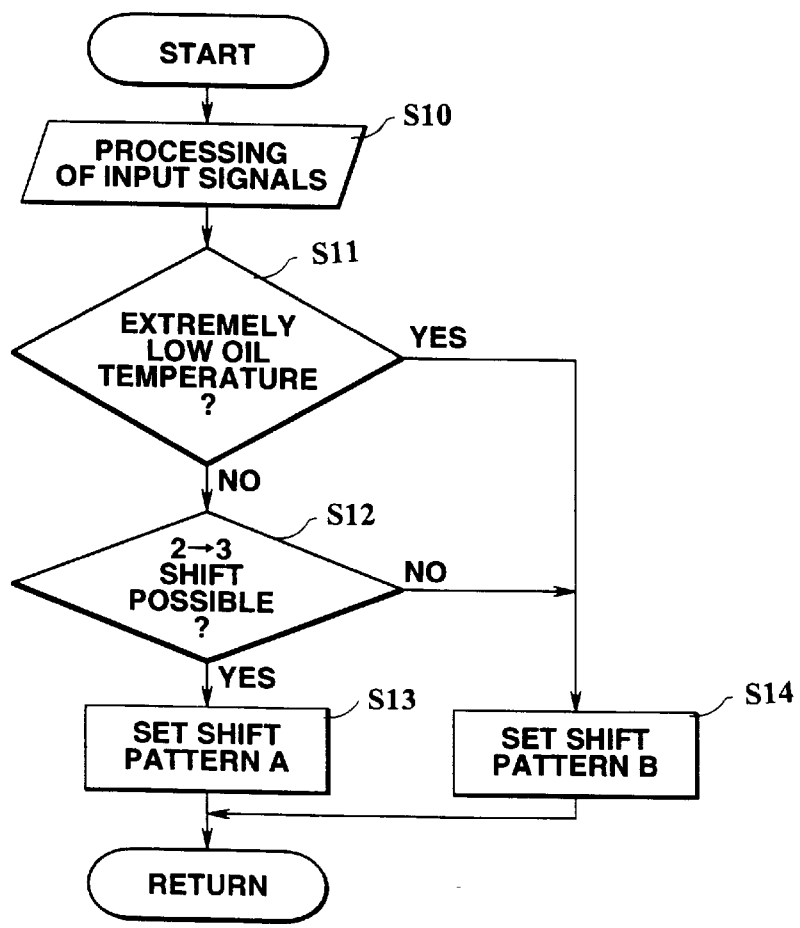
FIG. 3 is a flow chart showing one example of a control routine for inhibiting a second speed.

In FIG. 3, the input signals are processed (at Step S10), and it is then decided (at Step S11) whether or not the oil pressure is extremely low. The reference temperature to be adopted for this decision can be exemplified by $-15°$ or $-30°$ C., as in the foregoing example. If the decision of Step S11 is denied because the oil temperature is considerably high, it is decided (at Step S12) whether or not the shift from the second speed to the third speed is possible. This decision of Step S12 is executed for a reason similar to the aforementioned one of Step S5 shown in FIG. 1 and can be executed like Step S5.

Figure 4A:
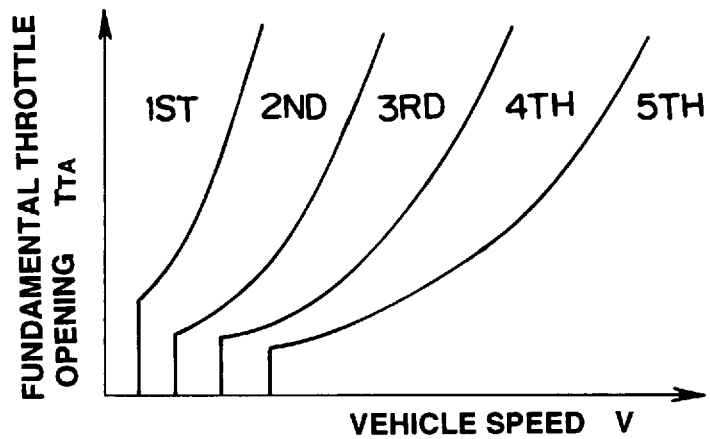
FIG. 4(A) is a diagram illustrating an ordinary shift pattern conceptionally.

If the decision of Step S12 is affirmed because of no failure of the linear solenoid valve SLU or the sensors, a normal shift pattern (or shift diagram) is set (at Step S13). This shift pattern is exemplified by pattern A covering all the shift region from the first speed to the fifth speed, as shown in FIG. 4(A).

Figure 4B:
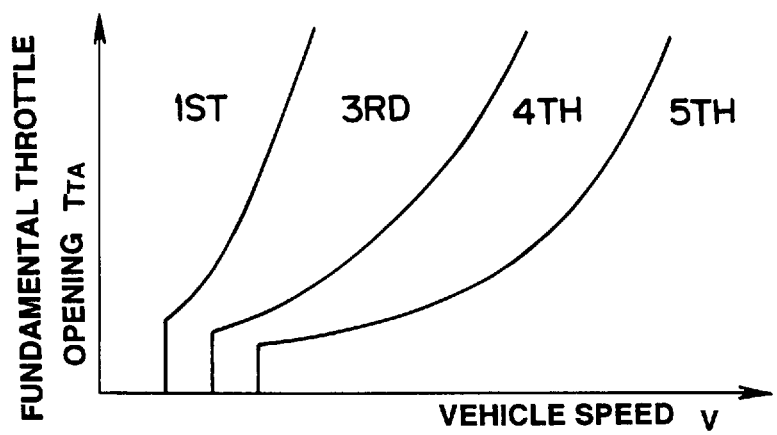
FIG. 4(B) is a diagram illustrating a shift pattern for inhibiting the second speed conceptionally.

On the contrary, if the decision of Step S11 is affirmed because of an extremely low oil temperature and if the decision of Step S12 is defined because of the impossible shift from the second speed to the third speed, the shift pattern (or shift diagram) is set (at Step S14) to one having no second speed region set. This is exemplified by a pattern B, as shown in FIG. 4(B). In this shift pattern B, a lower speed portion of the second speed region in the shift patter, as ordinarily used, is brought to the first speed region, and a higher speed portion is brought to the third speed region so that the second speed region is eliminated. According to this shift pattern, therefore, the upshift from the first speed is the so-called "jump shift" jumping to the third speed and may be effected by applying the second brake B2 with the first speed being set, so that the clutch-to-clutch shift can be avoided.

If the second speed is inhibited, as described above, the jump shift from the first speed to the third speed occurs. In this case, the torque reduction to be executed at the shifting time is larger than that, as required for the shift from the first speed to the second speed, because the changing width of the speed ratio is larger. In this case, therefore, the control of reducing the engine torque is executed by throttling the throttle valve, as shown by the flow chart of FIG. 5.

Figure 5:
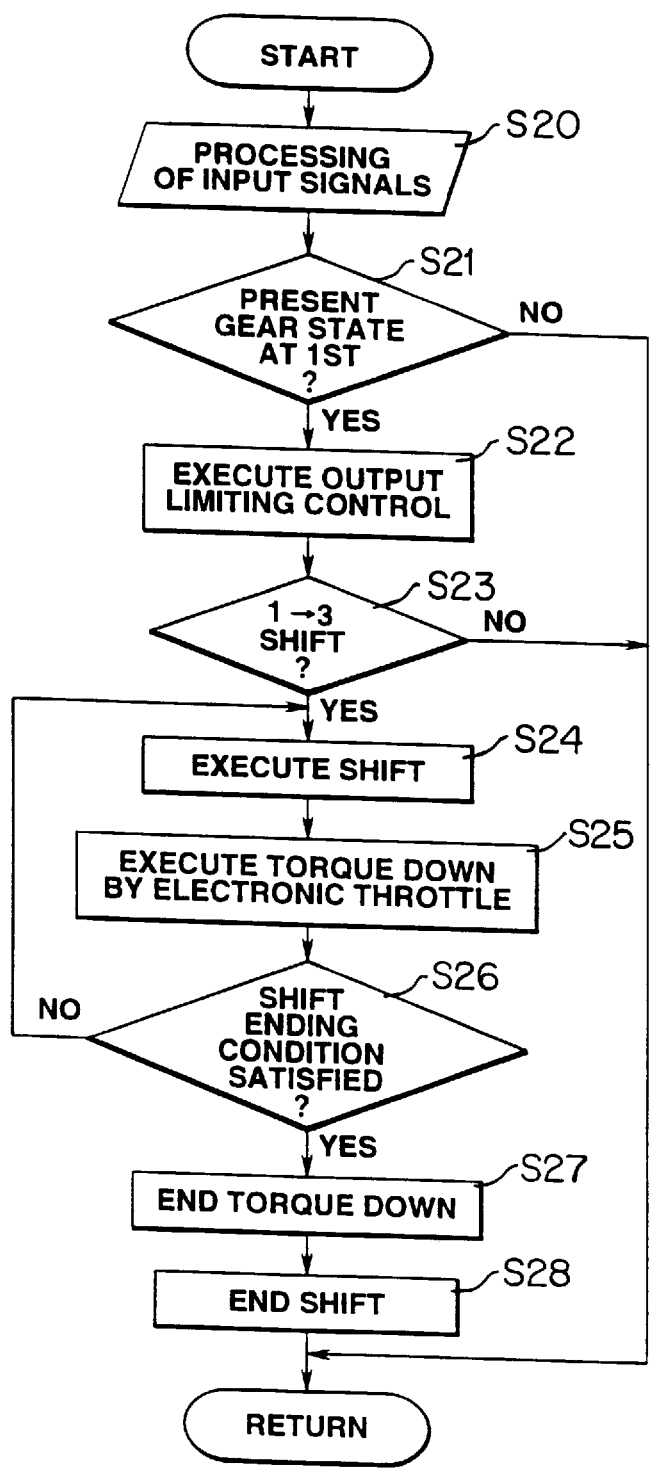
FIG. 5 is a flow chart showing one example of a control routine for an engine torque reducing control at a jump shift from a first speed to a third speed.

Specifically, as shown in FIG. 5, the input signals are processed (at Step S20) first of all, and it is then decided (at Step S21) whether or not the present gear stage is at the first speed. The routine is returned, if the decision is denied because the first speed is not set yet, but the control of limiting the engine output is executed (at Step S22) if the first speed is set so that the decision is affirmed.

As described with reference to FIG. 1, the state, in which the setting of the second speed is inhibited, takes place if the oil temperature is extremely low or if the linear solenoid valve SLU fails. Simultaneously with this, the control of reducing the engine output at the first speed is executed. Moreover, this reducing control of the engine output is executed by making the engine output characteristics proper to the accelerator opening (i.e., the depression of the accelerator pedal). Specifically, the upper limit is set, or the output characteristics are set to those for a low output.

Next, it is decided (at Step S23) whether or not the shift is from the first speed to the third speed. This decision is made in view of the increase in the vehicle speed or the decrease in the fundamental throttle opening TTA. The routine is returned if the decision of Step S23 is denied, but the shift is executed (at Step S24) if the same decision is affirmed. Specifically, the signal is outputted to switch the shift solenoid valve to the ON/OFF state, as shown in FIG. 10. Then, the control of reducing the engine torque by the electronic throttle valve 23 is executed (at Step S25).

Figure 6:
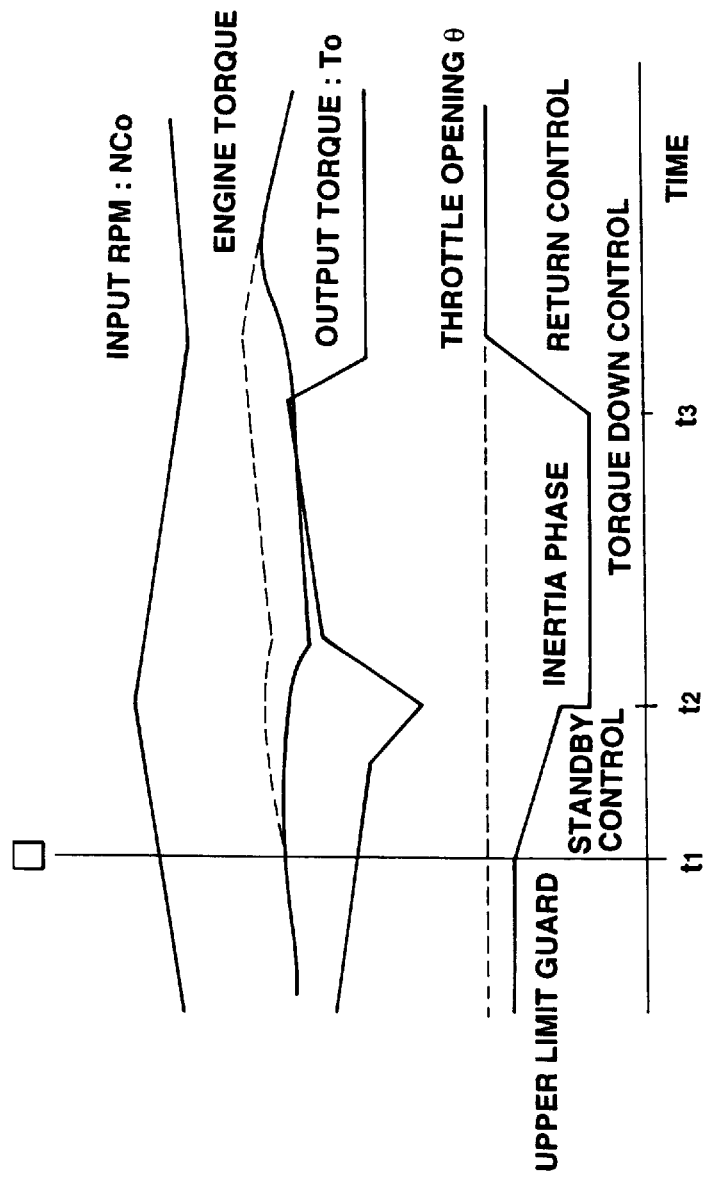
FIG. 6 is a diagram illustrating changes in the throttle opening, the engine torque, the input RPM and the output torque at the time of the engine torque reducing control to be executed in the control shown in FIG. 5.

This control is executed by the engine electronic control unit 21 but is different from that of the prior art in that it is the torque reducing control from the aforementioned state in which the engine output is limited, and in that the engine output is gradually reduced (or swept down) in the torque phase, too. This will be described with reference to FIG. 6. With the first speed being set, before the start of the shift control, the throttle opening θ is kept at a lower level than that of the ordinary case (as indicated by a broken line) so as to effect the engine output limiting control. If the shift decision is satisfied in this state so that the shift control is started at a time t1, the throttle opening θ is gradually lowered at a predetermined decreasing rate.

This so-called "sweep-down" is continued till the inertia phase is started. In the intermediate torque phase, the output torque is lowered by the start of the shift. Therefore, the reduction, as caused by lowering the throttle opening θ, in the engine torque is preferably approximate to the reducing tendency of the output torque in the torque phase. Thus, the reduction in the engine torque, as caused by lowering the throttle opening θ, is so hidden under the reduction in the output torque in the torque phase so that the stall feeling and the shocks can be prevented.

Simultaneously as the start of the inertia phase is decided at a time t2, the throttle opening θ is further lowered to reduce the engine output to a predetermined level. In this meanwhile, the rotation change is caused to progress the speed change. At a time t3 when the input RPM NCO grows substantially identical to the synchronous RPM of the gear stage after the shift, namely, the third speed, the end of the inertia phase is decided. Till then, the control of reducing the engine output by the throttle valve is continued. Hence, the operation of Step S25 corresponds to the torque reducing control means in the present invention.

Generally speaking, the control of reducing the engine output by lowering the throttle opening θ is liable to delay in response. If the engine output limiting control is executed in advance, as described above, or if the sweep-down control is executed in the torque phase, the reducing width of the engine torque at the starting time t2 of the inertia phase can be reduced to avoid the response delay in the engine torque reducing control. In other words, even if the engine torque reducing width is large because of the jump shift from the first speed to the third speed, the engine torque reducing control can be executed without not only the stall feeling or the shocks but also the response delay. As a result, it is possible to prevent the shifting shocks or the drop in the durability of the frictional engagement units in advance.

After the engine torque reducing control by the electronic throttle valve 23 was executed, as described above, it is decided (at Step S26) whether or not the shift ending condition is satisfied. This decision can be made on the basis of the input signals coming from the RPM sensor and the timer. The controls of Steps S24 and S25 are continued till that shift ending condition is satisfied. If this condition is satisfied to affirm the decision of Step S26, the routine advances to Step S27, at which the engine torque reducing control is ended. This engine torque returning control is executed as in the prior art, as indicated by a single-dotted curve in FIG. 6, by increasing (or sweeping up) the engine torque gradually till the ordinary throttle opening θ. Hence, the operation of Step S27 corresponds to the return control means in the present invention.

Then, the shift ending control is executed (at Step S28) to end the back pressure control of the accumulator 121 by the linear solenoid valve SLN for controlling the oil pressure of the second brake B2 to set the third speed.

Incidentally, the example described above has been explained on the engine in which only the electronic throttle valve is arranged in the intake pipe. Despite of this explanation, the present invention can also be practiced if applied to another engine in which a sub-throttle valve to be electrically controlled is arranged upstream of the throttle valve, as controlled directly by the accelerator pedal. In this modification, the control of reducing the engine torque at a shifting time is executed by lowering the degree of opening of the sub-throttle valve.

Moreover, the condition for the present invention to limit the engine output should not be limited to that the oil temperature is extremely low or that the shift from the second speed to the third speed is inhibited, as exemplified in the foregoing example, but could be suitably set, if necessary. Still moreover, the present invention can be practiced in an automatic transmission which is provided with a gear train or a hydraulic circuit other than the aforementioned gear train, as shown in FIG. 9, or the aforementioned hydraulic circuit, as shown in FIG. 12.

Here will be synthetically described the advantages which can be obtained from the present invention. According to the present invention, prior to a shift, the engine output is limited to a predetermined value. As a result, when the torque reducing control at the shifting time is executed by lowering the throttle opening, the torque reduction in the inertia phase can be decreased to prevent in advance the response delay in the torque reducing control and the resultant shifting shocks or the reduction in the durability of the frictional engagement units.

Especially in the present invention, at the jump shift in which the torque reduction is high, the engine output is limited in advance so that the response delay in the torque reducing control can be prevented while retaining the torque reduction, as required.

In the present invention, moreover, the engine output is gradually lowered till the start of the inertia phase during the shift so that the change in the engine torque is hidden under the change in the output torque in the torque phase thereby to prevent incompatibility. At the starting time of the inertia phase, on the other hand, the engine torque can be kept reduced so that the engine torque reducing control at the inertia phase starting time can be executed without any delay.

What is claimed is:

1. An integral control system for an engine and an automatic transmission, in which the engine torque is reduced at a shifting time by the automatic transmission, comprising:

engine torque limiting means for limiting the engine torque to a predetermined value or less prior to the start of a shift by the automatic transmission when a predetermined condition is satisfied prior to the start of the shift, and means for deciding the satisfaction of said condition by detecting at least one of that an angular delay control for changing an ignition timing of said engine cannot be executed and that an oil temperature of said automatic transmission is lower than a predetermined reference level.

2. An integral control system according to claim 1, further comprising:

means for deciding that said angular delay control cannot be executed from the fact that a cooling water temperature of said engine is lower than a predetermined level.

3. An integral control system according to claim 1, further comprising:

means for deciding that said angular control cannot be executed by detecting that the temperature of a catalyst for cleaning an exhaust gas of said engine fails to fall within a predetermined temperature range.

4. An integral control system according to claim 1, wherein said engine torque limiting means includes means for limiting a throttle opening of said engine to a predetermined value or less.

5. An integral control system according to claim 1, wherein said engine torque limiting means includes means for setting the engine torque to a low value by reducing the increase in a throttle opening relative to the depression of an accelerator pedal.

6. An integral control system for an engine and an automatic transmission, in which a throttle opening by a throttle valve mechanism is lowered at a shifting time of the automatic transmission to reduce the engine torque, comprising:

means for detecting the start of an inertia phase at the time of a shift of said automatic transmission;

means for detecting the end of said shift;

torque reduction control means for reducing the engine torque by throttling the throttle opening by said throttle valve mechanism till the start of said inertia phase of a shift for changing a gear stage apart by two or more stages to reduce the engine torque continuously to a predetermined value and by further throttling said throttle opening by said throttle valve mechanism after the start of said inertia phase; and return control means for returning said engine torque by increasing said throttle opening continuously by said throttle valve mechanism after the torque reducing control by said torque reduction control means.

7. An integral control system according to claim 6, wherein said throttle valve mechanism includes an electronic throttle valve adapted to be electrically controlled on the basis of the depression of an accelerator pedal.

8. An integral control system according to claim 6, wherein said throttle valve mechanism includes: a main throttle valve associated with an accelerator pedal; and a sub-throttle valve arranged upstream of said main throttle valve and adapted to be electrically controlled.

9. The control system according to claim 6, wherein said return control means comprises means for returning said engine torque gradually by increasing said throttle opening continuously by said throttle valve mechanism after the torque reducing control by said torque reduction control means.

10. An integral control system for an engine and an automatic transmission, in which the engine torque is reduced at a shifting time by the automatic transmission, comprising:

engine torque limiting means for limiting the engine torque to a predetermined value or less prior to the start of a shift by the automatic transmission when a predetermined condition is satisfied prior to the start of the shift; and means for deciding the satisfaction of said condition from the fact that a higher gear stage adjacent to an actually set gear stage is inhibited.

11. An integral control system for an engine for an automatic transmission, in which the engine torque is reduced at a shifting time by the automatic transmission, comprising:

engine torque limiting means for limiting the engine torque to a predetermined value or less prior to the start of a shift by the automatic transmission when a predetermined condition is satisfied prior to the start of the shift, and means for deciding the satisfaction of said condition from the fact that the setting of a second forward speed is inhibited.

12. An integral control system according to claim 11, wherein said engine torque limiting means includes means for limiting the output torque of said engine at the time of setting a first forward speed to the predetermined value or less when the means for deciding the satisfaction of said condition detects the inhibition of the second forward speed.

13. An integral control system for an engine and an automatic transmission, in which the engine torque is reduced at a shifting time by the automatic transmission, comprising:

engine torque limiting means for limiting the engine torque to a predetermined value or less prior to the start of a shift by the automatic transmission when said shift is a speed change to a gear stage apart by two or more stages.

14. An integral control system for an engine and an automatic transmission, in which a throttle opening by a throttle valve mechanism is lowered at a shifting time of the automatic transmission to reduce the engine torque, comprising:

means for detecting the start of an inertia phase at the time of a shift of said automatic transmission;

means for detecting the end of said shift;

torque reduction control means for reducing the engine torque at the time of a jump shift from a first forward speed to a third forward speed, by throttling the throttle opening by said throttle valve mechanism till the start of said inertia phase to reduce the engine torque continuously to a predetermined value and by further throttling said throttle opening by said throttle valve mechanism after the start of said inertia phase; and return control means for returning said engine torque gradually by increasing said throttle opening continuously by said throttle valve mechanism after the torque reducing control by said torque reduction control means.

15. An integral control system according to claim 14, further comprising:

engine torque limiting means for limiting the output torque of said engine to a predetermined value or less when the first forward speed is set.

16. An integral control system according to claim 14, further comprising:

engine torque limiting means for limiting the output torque of said engine to a predetermined value or less when the first forward speed is set, by limiting the throttle opening of said engine to a predetermined value or less.

17. An integral system according to claim 14, further comprising:

engine torque limiting means for setting the engine torque to a low value by reducing the increase in the throttle opening relative to the depression of an acceleration pedal.

* * * * *